(12) United States Patent
Inoue (10) Patent No.: US 10,019,117 B2
(45) Date of Patent: Jul. 10, 2018

(54) POSITION DETECTING DEVICE AND PROJECTOR

(71) Applicant: CASIO COMPUTER CO., LTD., Shibuya-ku, Tokyo (JP)

(72) Inventor: Hideaki Inoue, Musashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 58 days.

(21) Appl. No.: 15/189,780

(22) Filed: Jun. 22, 2016

(65) Prior Publication Data

US 2017/0075501 A1    Mar. 16, 2017

(30) Foreign Application Priority Data

Sep. 16, 2015    (JP) .................. 2015-182506

(51) Int. Cl.
*G06F 3/042*    (2006.01)
*G06F 3/041*    (2006.01)

(52) U.S. Cl.
CPC .......... *G06F 3/0425* (2013.01); *G06F 3/0418* (2013.01)

(58) Field of Classification Search
CPC ........................... G06F 3/0418; G06F 3/0425
See application file for complete search history.

(56) References Cited

U.S. PATENT DOCUMENTS

2013/0222237 A1* 8/2013 Jesme .................. G06F 3/0425
345/156
2015/0123899 A1* 5/2015 Taylor .................. G06F 3/0425
345/157

FOREIGN PATENT DOCUMENTS

JP        2015064550 A    4/2015

* cited by examiner

*Primary Examiner* — Insa Sadio
(74) *Attorney, Agent, or Firm* — Holtz, Holtz & Volek PC (57) ABSTRACT

Provided is a position detecting device including: a light emission unit configured to emit light in a predetermined wavelength band in a manner substantially parallel to a plane surface; a polarization filter configured to transmit p polarized light of light reflected on the plane surface and to block s polarized light thereof; and an imaging unit configured to perform imaging of the plane surface obliquely from above with the light in the predetermined wavelength band through the polarization filter.

13 Claims, 6 Drawing Sheets

POSITION DETECTING DEVICE AND PROJECTOR

BACKGROUND OF THE INVENTION

Field of the Invention

An embodiment of the present invention relates to a position detecting device, and a projector having a position detecting function.

Description of the Related Art

Recently, a projector having an interactive function with which it is possible to input a position on a projected screen has appeared. This projector can not only project an image but also input positional information in real time with touch operation. Accordingly, it is possible to input operation information (positional information) only with a touch on a projection screen without operation of a mouse and to easily realize an electronic blackboard function. That is, it is possible to provide a projection screen of a projector as a pseudo touch panel on which operation or writing can be performed with a direct touch.

Similarly, there is a product called a laser keyboard with which it is possible to perform a key input by projection of a keyboard image with a laser beam on a plane surface and by a touch on the keyboard image. Since the laser keyboard can realize a keyboard function in a compact manner with a projection unit and a camera, the laser keyboard is suitable for a keyboard for a mobile device such as a smartphone. After pairing a laser keyboard and a smartphone, for example, by Bluetooth (registered trademark), a user places the laser keyboard on a desk, touches a keyboard projected with a laser beam, and performs a key input.

In Japanese Patent Application Laid-Open No. 2015-064550, an invention related to what is similar to the above-described projector is disclosed.

Figure 6:
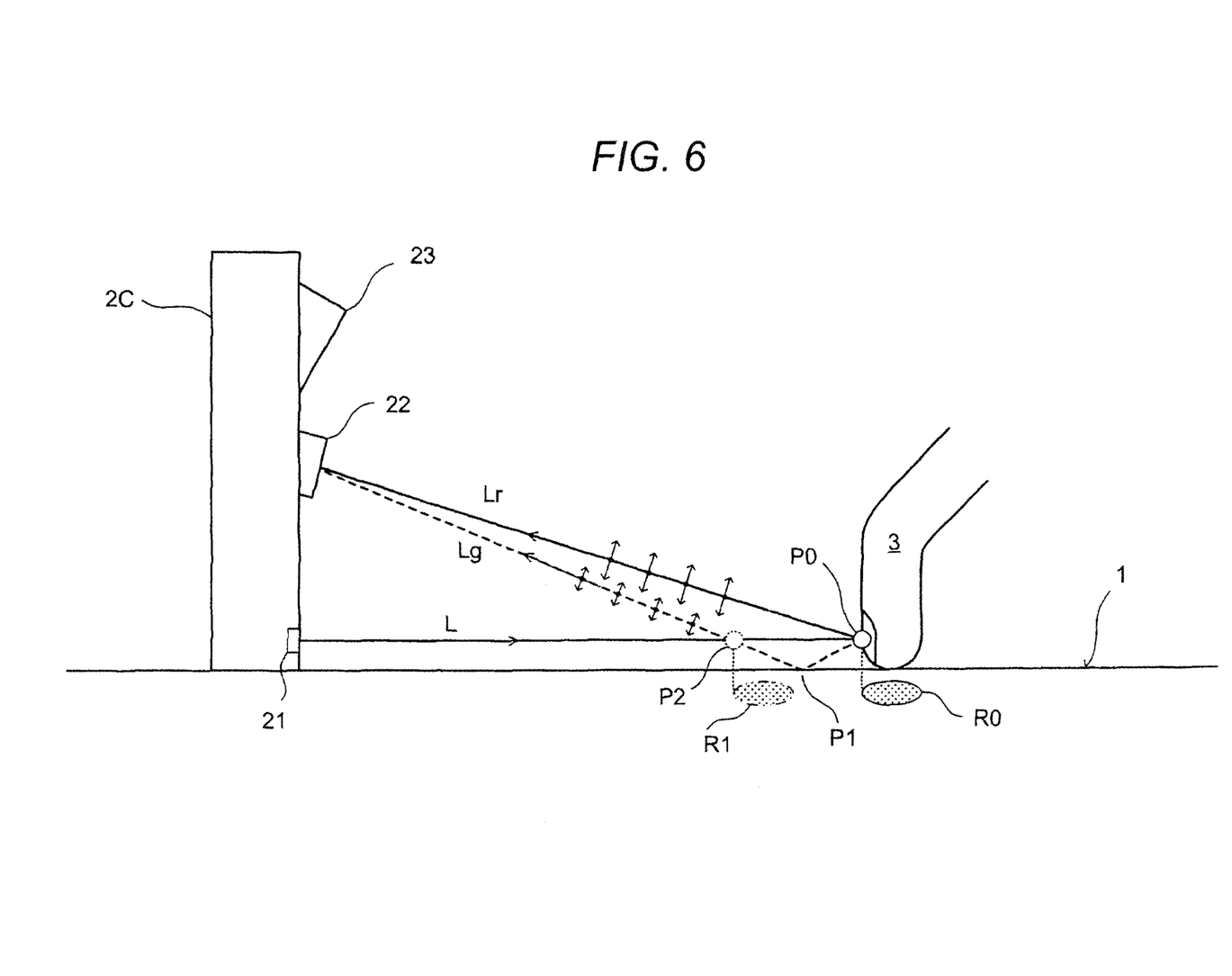
FIG. 6 is a side view illustrating a configuration and an operation of a projector of a comparison example.

As illustrated in FIG. 6, in a case of using a glossy desk 1 as a pseudo touch panel, infrared light reflected at a light blocking point PO on a finger 3 includes a light beam, which is reflected again on a glossy surface of the desk 1 and passes through a wrong optical path Lg entering an IR camera 22, other than a light beam that passes through a correct optical path Lr directly entering the IR camera 22.

When reflection intensity of the desk 1 is low, there is no problem. However, when the desk 1 is glossy and reflection intensity thereof is high, in a case where intensity of an unnecessary light beam passing through the wrong optical path Lg exceeds a threshold, it is determined that there is a pseudo light blocking point P2 and a wrong touch position R1 is erroneously recognized.

Thus, an embodiment of the present invention is to prevent erroneous recognition of a touch position in a position detecting device or a projector to detect a touch position with a camera.

SUMMARY OF THE INVENTION

According to an embodiment of the present invention, there is provided a position detecting device including: a light emission unit configured to emit light in a predetermined wavelength band in a manner substantially parallel to a plane surface; a polarization filter configured to transmit p polarized light of light reflected on the plane surface and to block s polarized light thereof; and an imaging unit configured to perform imaging of the plane surface obliquely from above with the light in the predetermined wavelength band through the polarization filter.

According to another embodiment of the present invention, there is provided a projector including: the position detecting device according to any one of claim 1 to claim 4; a projection unit configured to project, on the plane surface, light in a wavelength band different from a predetermined wavelength band used by the position detecting device; and an associating unit configured to associate a position of the light projected by the projection unit and a position of an object detected by the position detecting unit.

DETAILED DESCRIPTION OF THE PREFERRED EMBODIMENT

In the following, embodiments of the present invention will be described in detail with reference to the drawings.

Figure 1:
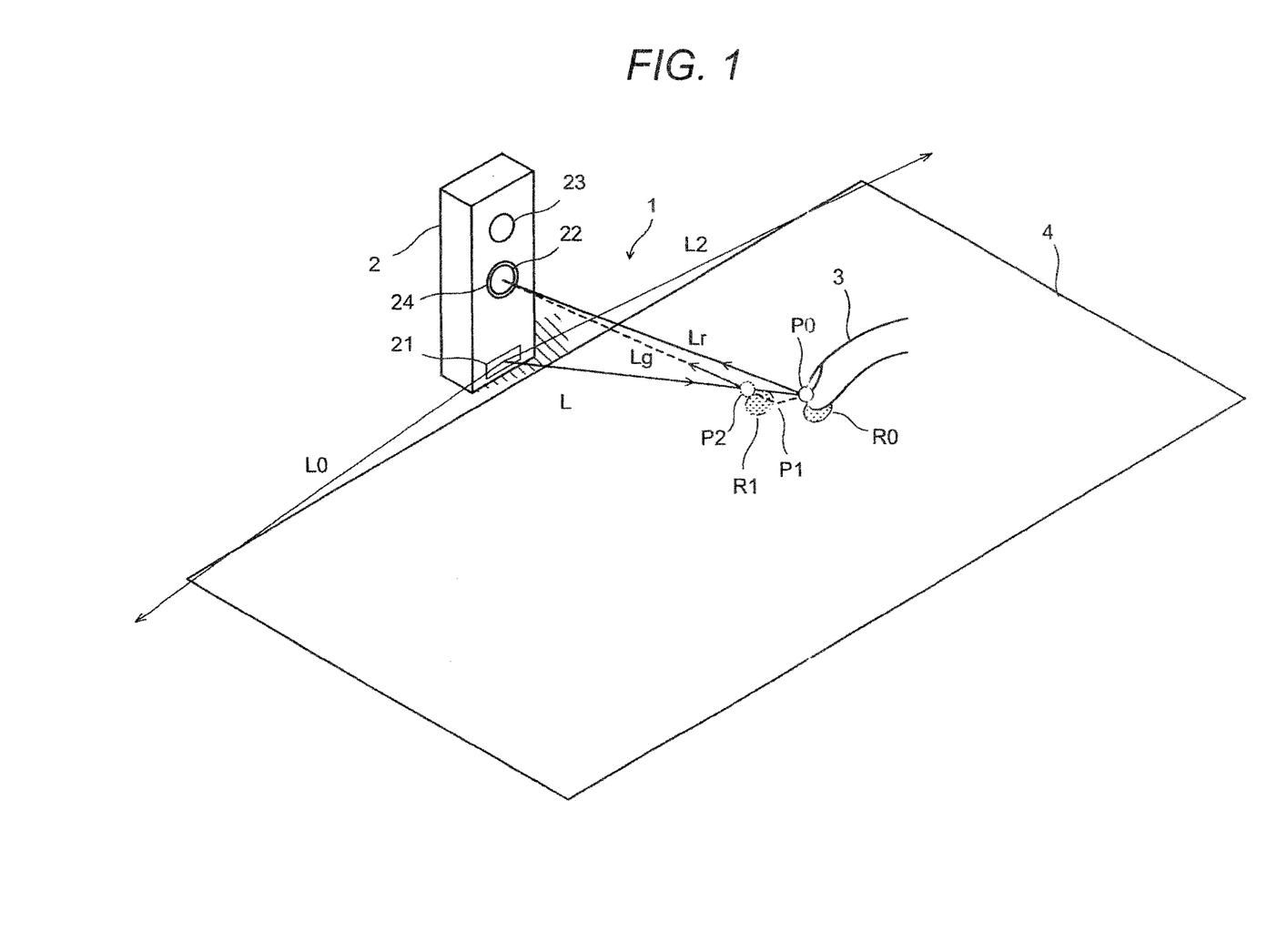
FIG. 1 is a schematic view illustrating a projector of a first embodiment.

FIG. 1 is a schematic view illustrating a projector 2 of a first embodiment.

The projector 2 of the first embodiment includes a projection unit 23, an IR camera 22 in which an IR polarization filter 24 is mounted, and a fan-shaped IR emission unit 21. The projector 2 is placed on the desk 1, the desk 1 being used as a pseudo touch panel. Since a surface of the desk 1 is coated with glass, a part of light is absorbed and the other part of light is reflected.

The projection unit 23 projects an image in a projection region 4 on a top surface of the desk 1. The projection unit 23 performs geometrical correction of an image to be projected to eliminate a distortion of an image projected on the top surface of the desk 1. The projection unit 23 includes a light source, an IR cut filter, a micro mirror element, a projection lens, and the like (not illustrated). The projection unit 23 eliminates infrared light in a projected image as much as possible with the IR cut filter (not illustrated) and eliminates an influence on the IR camera 22.

The fan-shaped IR emission unit 21 emits near-infrared light in a fan-shaped manner very closely to the desk 1. Here, a range of emission of the fan-shaped IR emission unit 21 is from fan-shaped IR emission L0 to fan-shaped IR emission L2. The IR camera 22 is an imaging unit and images an image in a wavelength band of infrared light through the IR polarization filter 24. Near-infrared light emitted by the fan-shaped IR emission unit 21 is in parallel with the desk 1 and is not reflected. Also, the projection unit 23 cuts the band of the infrared light with the IR cut filter. Thus, when a user does not touch the desk 1 with the finger 3, there is no luminous point in an IR image imaged by the IR camera 22.

When the user touches the desk 1 with the finger 3, the near-infrared light emitted by the fan-shaped IR emission unit 21 is blocked by the finger 3 and the IR camera 22 images a light blocking point PO on the finger 3 as a luminous point. The projector 2 detects a point with luminance equal to or higher than a predetermined value and recognizes, with this luminous point, correct touch position R0 corresponding to the light blocking point PO on the finger 3. The projector 2 performs coordinate transformation of the recognized correct touch position R0 and determines which position on the projected image is touched. Accordingly, it is possible to associate a position of light projected by the projection unit 23 and a position of an object detected by the IR camera 22 and to realize usage as a pseudo touch panel.

In a case of using the glossy desk 1 as the pseudo touch panel, near-infrared light that is reflected by the finger 3 and becomes incident to the IR camera 22 includes a light beam passing through the correct optical path Lr and an unnecessary light beam that is reflected by the finger 3 and the glossy surface of the desk 1 and passes through the wrong optical path Lg entering the IR camera 22. When intensity of the unnecessary light beam passing through the wrong optical path Lg is equal to or higher than a certain degree, it is erroneously recognized that the finger 3 is placed in a wrong touch position RE However, in the projector 2 of the first embodiment, the light that is reflected again on the glossy surface of the desk 1 is weakened by the IR polarization filter 24 to prevent the erroneously recognition.

Figure 2:
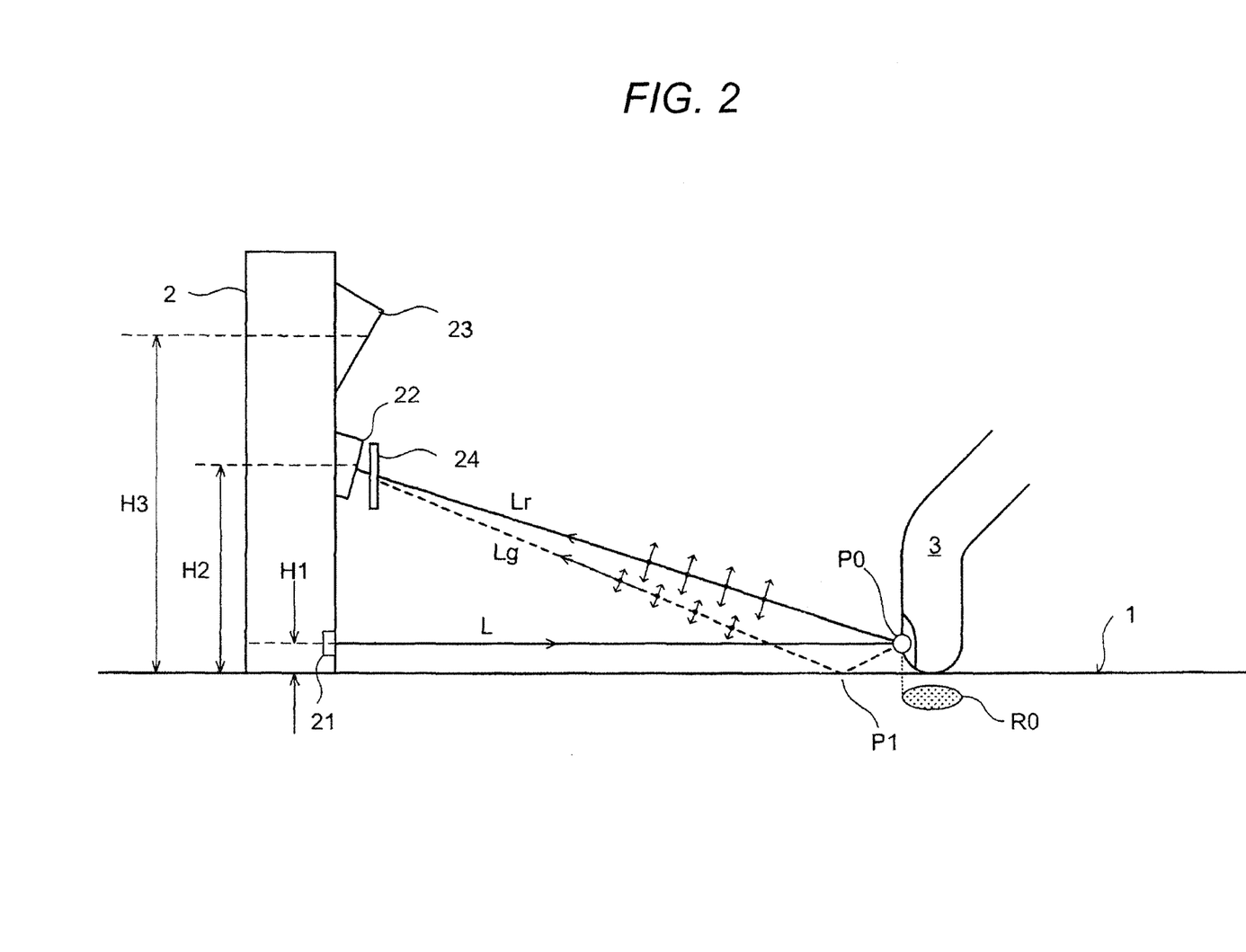
FIG. 2 is a side view illustrating a configuration and an operation of the projector of the first embodiment.

FIG. 2 is a side view illustrating a configuration and an operation of the projector 2 of the first embodiment.

The projection unit 23 is provided at a height H3 from the desk 1, the IR camera 22 is provided at a height H2, and the fan-shaped IR emission unit 21 is provided at a height HE In the first embodiment, the projection unit 23 is provided at a position higher than that of the IR camera 22. Accordingly, it is possible to minimize a distortion in projection.

The height H1 of the fan-shaped IR emission unit 21 is, for example, a several millimeters.

In front of the IR camera 22, the IR polarization filter 24 to block s polarized light among polarization components of the light reflected on the glossy surface of the desk 1 is inserted. A transmission axis of the IR polarization filter 24 is vertical to the top surface of the desk 1. The IR polarization filter 24 blocks the s polarized light and transmits the p polarized light. Also, the IR polarization filter 24 is provided in a manner substantially vertical to the top surface of the desk 1. Accordingly, it is possible to suitably block the s polarized light and to transmit the p polarized light in light from right and left side surfaces of the projector 2.

Near-infrared light that is reflected at the light blocking point PO on the finger 3 and that passes through the correct optical path Lr is unpolarized light, intensity of the s polarized light and that of the p polarized light thereof being substantially identical. On the other hand, in near-infrared light that is reflected on the glossy surface of the desk 1 and passes through the wrong optical path Lg, p polarized light is weakened with respect to the s polarized light. However, intensity of the light depends on a material of a glossy surface and a reflection angle. In FIG. 2, a difference between a length in a vertical direction of an arrow of the correct optical path Lr and that of the wrong optical path Lg schematically indicates a difference in intensity of the p polarized light.

Here, the p polarized light of a polarization component indicates near-infrared light having an electric field an oscillation direction of which is vertical to the top surface of the desk 1. The s polarized light of a polarization component indicates near-infrared light having an electric field an oscillation direction of which is horizontal to the top surface of the desk 1.

When the IR polarization filter 24 having a transmission axis in a vertical direction is inserted in front of the IR camera 22 in such a manner as to block the s polarized light of the polarization component, near-infrared light passing through the correct optical path Lr becomes a half of a case where there is no IR polarization filter 24. Near-infrared light passing through the wrong optical path Lg is weakened in a greater degree.

As a result, a difference between intensity of entering the IR camera 22 of the near-infrared light passing through the correct optical path Lr and that of the near-infrared light passing through the wrong optical path Lg is increased. Accordingly, an SN ratio of the near-infrared light that enters the IR camera 22 is improved and it becomes possible to clearly distinguish the former as valid light and the latter as invalid light.

Figure 3:
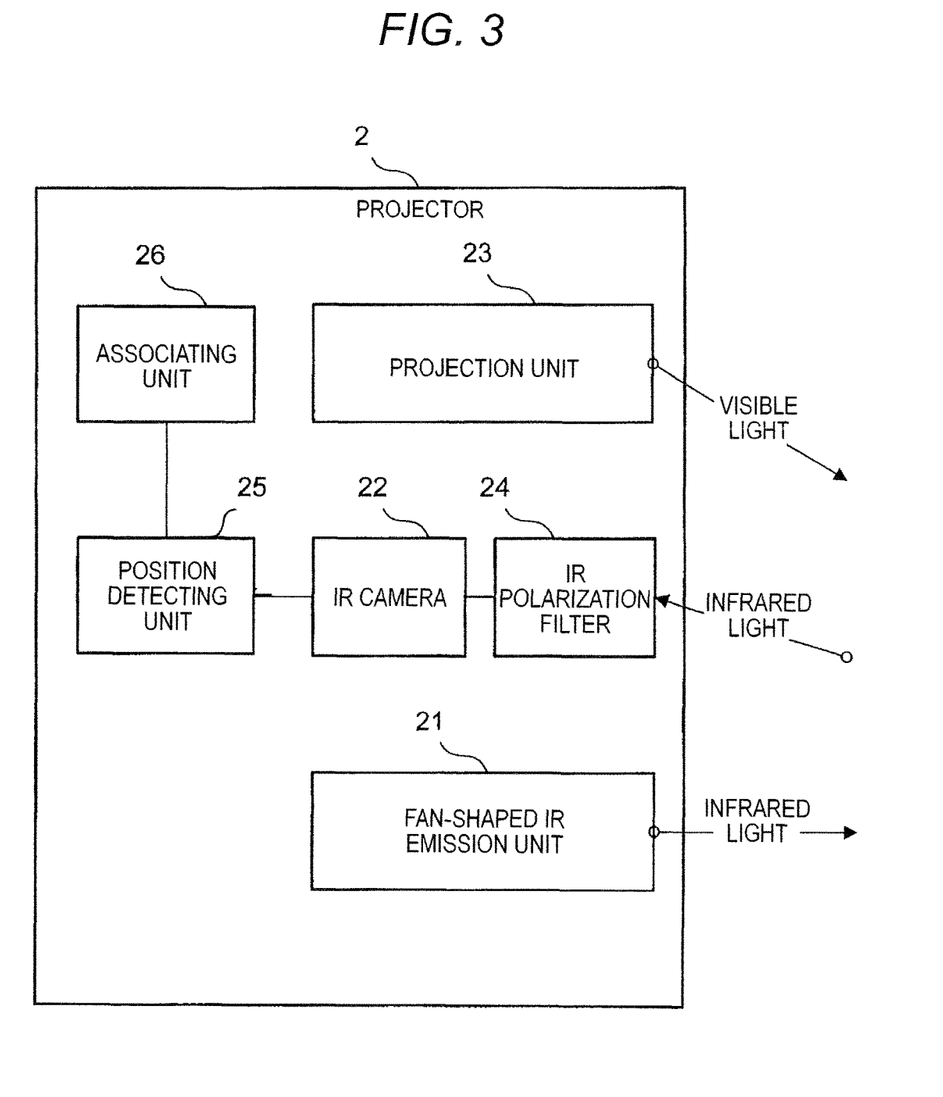
FIG. 3 is a block diagram illustrating the projector of the first embodiment.

FIG. 3 is a block diagram of the projector of the first embodiment.

The projector 2 includes a position detecting unit 25 and an associating unit 26 in addition to the projection unit 23, the IR polarization filter 24, the IR camera 22, and the fan-shaped IR emission unit 21 described with reference to FIG. 1 or FIG. 2.

The position detecting unit 25 detects a point with luminance equal to or higher than a predetermined value and a position thereof from an IR image imaged by the IR camera 22. The position detecting unit 25 transforms a coordinate of the detected luminous point (object) on the IR image into a coordinate on the projection region 4.

The associating unit 26 associates a position of the light projected by the projection unit 23 and the position of the object detected by the position detecting unit 25. More specifically, the associating unit 26 associates a coordinate of the projected image and a coordinate of the object detected by the position detecting unit 25. Accordingly, it is possible to include a pseudo touch panel function in the projector 2.

Figure 4:
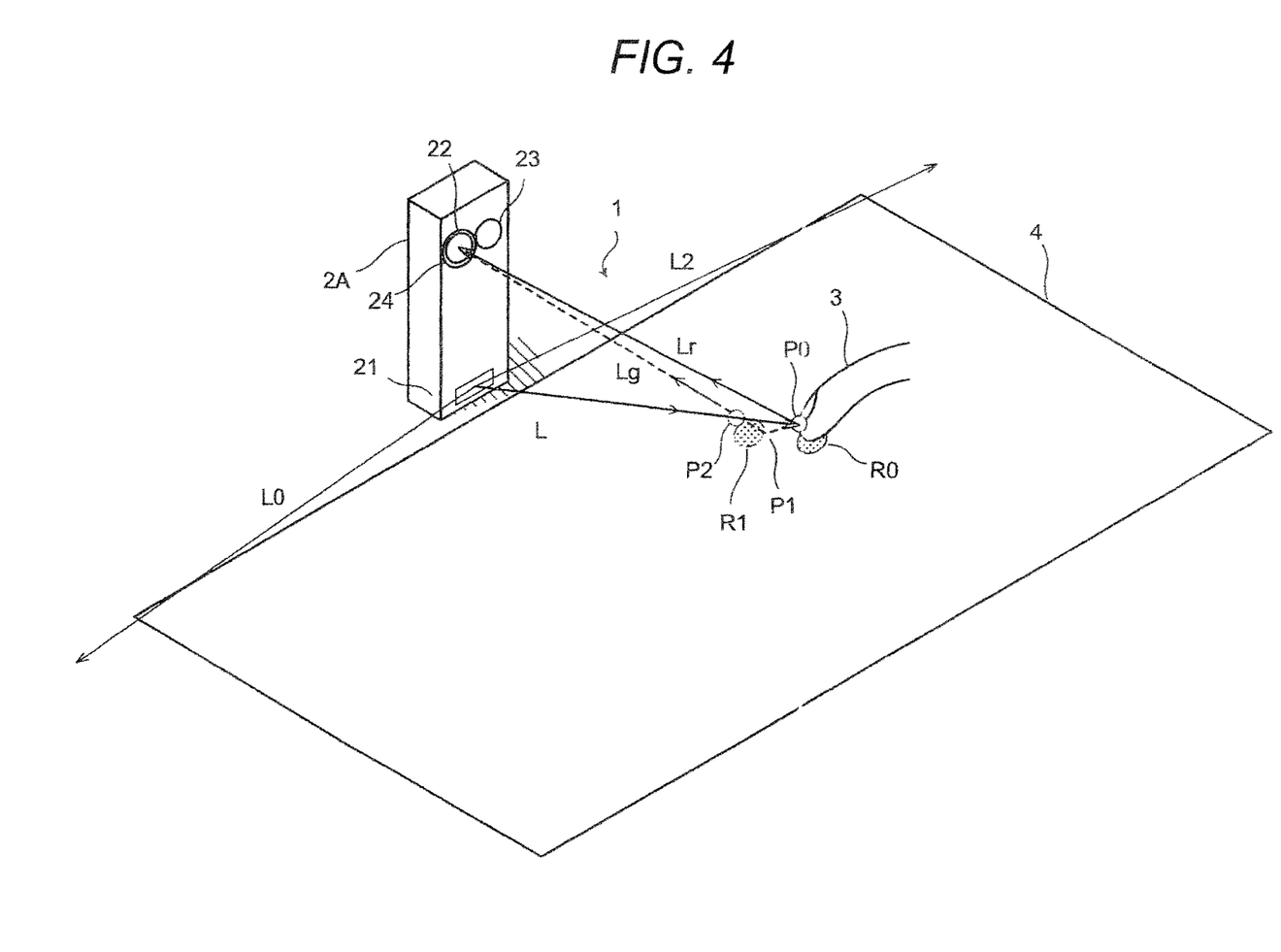
FIG. 4 is a schematic view illustrating a projector of a second embodiment.

FIG. 4 is a schematic view illustrating a projector 2A of a second embodiment. The same sign is assigned to an element identical to that of the projector 2 of the first embodiment which projector is illustrated in FIG. 1.

Unlike the projector 2 of the first embodiment, in the projector 2A of the second embodiment, an IR camera 22 is arranged at the same height with a projection unit 23. Accordingly, the IR camera 22 photographs a projection region 4 from a high position and an error in detection of a light blocking point PO on a finger 3 is decreased.

Figure 5:
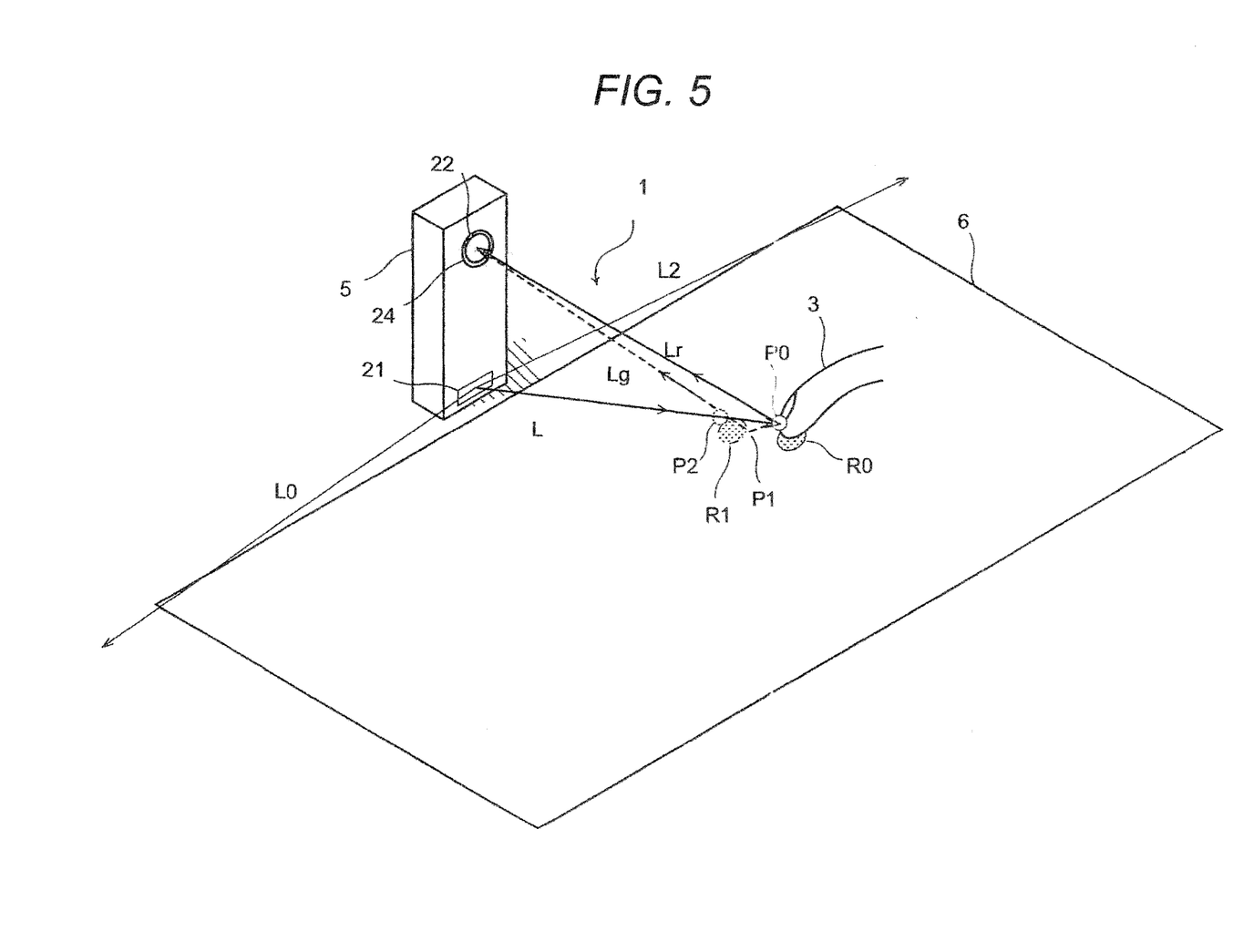
FIG. 5 is a schematic view illustrating a position detecting device of a third embodiment.

FIG. 5 is a schematic view illustrating a position detecting device 5 of a third embodiment.

The position detecting device 5 of the third embodiment is configured in a manner similar to that of the first embodiment other than a point that a projection unit 23 is removed from the projector 2 of the first embodiment. The position detecting device 5 is arranged at an edge of a sheet 6, on which a layout of a keyboard is previously printed, and a position of the device is adjusted to the sheet 6. An operation of the position detecting device 5 is similar to that of the projector 2 of the first embodiment.

Modification Example

The present invention is not limited to the above embodiments and can be modified within the spirit and the scope of the present invention. There are, for example, the following (a) to (g).

(a) In each of the first and second embodiments, the fan-shaped IR emission unit 21 not necessarily emits infrared light and may emit ultraviolet light.

(b) Instead of emission of infrared light in a fan-shaped manner similarly to the above embodiments, scanning with beam-shaped infrared light may be performed in a fan-shaped manner to detect an operation region. Also, a plurality of light sources of parallel infrared light may be provided linearly to detect an operation region. There is no limitation.

(c) The projection unit 23 of each of the first and second embodiments may project a red laser beam or the like instead of visible light. Light emitted by the fan-shaped IR emission unit 21 may be light in a wavelength band different from that of light projected by the projection unit 23 and may be, for example, a blue laser beam.

(d) In the third embodiment, the fan-shaped IR emission unit 21 not necessarily emits infrared light and may emit ultraviolet light or visible light.

(e) A projector or a position detecting device of each of the above embodiments is not necessarily placed on the desk 1. For example, the projector or the position detecting device may be provided on a white board or a screen provided vertically or on a wall surface. There is no limitation.

(f) The IR polarization filter 24 of each of the above embodiments only needs to include a function of blocking s polarized light and transmitting p polarized light. A transmission axis of the IR polarization filter 24 only needs to be substantially vertical to a top surface of the desk 1 and may be, for example, in a range from 70° to 110°.

(g) The desk 1 on which a projector or a position detecting device of each of the above embodiments is placed includes a material other than metal and is, for example, glass or resin.

What is claimed is:

1. A position detecting device comprising:
   a light emission unit configured to emit light in a predetermined wavelength band in a direction substantially parallel to a plane surface;
   a polarization filter configured to i) transmit p-polarized light in a first light which is a light in the predetermined wavelength band reflected by an object and in which an intensity of s-polarized light and an intensity of the p-polarized light are substantially identical, ii) block the s-polarized light in the first light, iii) transmit p-polarized light in a second light which is a light in the predetermined wavelength band reflected by the object and thereafter reflected by the plane surface and in which the p-polarized light is weakened compared to s-polarized light thereof, and iv) block the s-polarized light in the second light; and
   an imaging unit configured to perform imaging of the plane surface obliquely from above with the lights in the predetermined wavelength band through the polarization filter; and
   a controller configured to judge the second light transmitted through the polarization filter as invalid light.

2. The position detecting device according to claim 1, further comprising a position detecting unit configured to detect a position of an object, which touches the plane surface, based on imaging information from the imaging unit.

3. A projector comprising:
   the position detecting device according to claim 2;
   a projection unit configured to project, on the plane surface, light in a wavelength band different from the predetermined wavelength band used by the position detecting device; and
   an associating unit configured to associate a position of the light projected by the projection unit and a position of the object detected by the position detecting unit.

4. The position detecting device according to claim 1, wherein a distance from the plane surface to a position where the imaging unit is provided is longer than a distance from the plane surface to a position where the light emission unit is provided.

5. A projector comprising:
   the position detecting device according to claim 4;
   a projection unit configured to project, on the plane surface, light in a wavelength band different from the predetermined wavelength band used by the position detecting device; and
   an associating unit configured to associate a position of the light projected by the projection unit and a position of the object detected by the position detecting unit.

6. The position detecting device according to claim 1, wherein the predetermined wavelength band is in a band of infrared light, and
   the imaging unit is an infrared camera.

7. A projector comprising:
   the position detecting device according to claim 6;
   a projection unit configured to project, on the plane surface, light in a wavelength band different from the predetermined wavelength band used by the position detecting device; and
   an associating unit configured to associate a position of the light projected by the projection unit and a position of the object detected by the position detecting unit.

8. A projector comprising:
   the position detecting device according to claim 1;
   a projection unit configured to project, on the plane surface, light in a wavelength band different from the predetermined wavelength band used by the position detecting device; and
   an associating unit configured to associate a position of the light projected by the projection unit and a position of the object detected by the position detecting unit.

9. The projector according to claim 8, wherein a distance from the plane surface to a position where the projection unit is provided is equal to or longer than a distance from the plane surface to a position where the imaging unit is provided.

10. The projector according to claim 8, wherein the position of the light projected by the projection unit and the position of the object detected by the position detecting unit are associated to each other.

11. The projector according to claim 8, wherein the projection unit includes a filter configured to cut the predetermined wavelength band used by the position detecting device, and
    light in which the predetermined wavelength band is cut by the filter is projected on the plane surface.

12. The projector according to claim 8, wherein the projection unit projects, on the plane surface, a laser beam having a wavelength different from that in the predetermined wavelength band used by the position detecting device.

13. A projector comprising:
    a position detecting device comprising: a light emission unit configured to emit light in a predetermined wavelength band in a direction substantially parallel to a plane surface; a polarization filter configured to transmit p-polarized light of a light reflected by the plane surface and to block s-polarized light thereof; and an imaging unit configured to perform imaging of the plane surface obliquely from above with the light in the predetermined wavelength band through the polarization filter;

a projection unit configured to project, on the plane surface, light in a wavelength band different from the predetermined wavelength band used by the position detecting device; and an associating unit configured to associate a position of the light projected by the projection unit and a position of an object detected by the position detecting unit, wherein the projection unit includes a filter configured to cut the predetermined wavelength band used by the position detecting device, and light in which the predetermined wavelength band is cut by the filter is projected on the plane surface.

* * * * *